United States Patent [19]

Mizokami

[11] 4,456,354
[45] Jun. 26, 1984

[54] EXPOSURE CONTROLLER FOR A CAMERA

[75] Inventor: Kazunori Mizokami, Hachioji, Japan

[73] Assignee: Olympus Optical Co., Ltd., Tokyo, Japan

[21] Appl. No.: 425,107

[22] Filed: Sep. 27, 1982

[30] Foreign Application Priority Data

Dec. 11, 1981 [JP] Japan .................................. 56-200380

[51] Int. Cl.³ ........................... G03B 7/93; G03B 7/99
[52] U.S. Cl. ..................................... 354/414; 354/429
[58] Field of Search ..................... 354/31, 23 D, 24, 51

[56] References Cited

FOREIGN PATENT DOCUMENTS

48-19251 6/1973 Japan .
53-36229 4/1978 Japan .

Primary Examiner—Michael L. Gellner
Attorney, Agent, or Firm—Weinstein & Sutton

[57] ABSTRACT

An exposure controller for a camera effects a correction of exposure toward overexposure by automatically displacing the point in time when an exposure period is determined, whenever there occurs a difference in the brightness between a main subject to be taken and its background, which exceeds a given value, as a result of rear lighting or the like. In this manner, it is assured that the subject be photographed with a proper exposure.

14 Claims, 8 Drawing Figures

EXPOSURE CONTROLLER FOR A CAMERA

BACKGROUND OF THE INVENTION

The invention relates to an exposure controller for a camera, and more particularly, to an exposure controller capable of assuring a proper exposure for taking a picture under a rear lighting condition which involves a large variation in the brightness level.

The photometry employed with cameras can generally be categorized, according to the distributed sensitivity to light incidence, into average photometry, a centrally biased photometry (or average photometry with emphasis on the central region) and spotwise photometry. These techniques of photometry are each advantageous in one aspect and disadvantageous in another. In general, depending on the condition of an object being photographed or the intent of photographic composition, a combination of spotwise photometry and average photometry may be used, or a centrally biased photometry which represents a median selection between the first mentioned photometry techniques may be used. Alternatively, an arrangement may be made to allow a choice between the centrally biased photometry and spotwise photometry or average photometry.

When a factor such as rear light produces a difference in the brightness level between a main subject to be taken such as a person located centrally on an image field and a marginal background which exceeds a given value, the main subject to be taken, for example, a person standing beside the window, will be subject to an underexposure if the average or centrally biased photometry is utilized.

For this reason, recent cameras are provided with a capability to effect both the spotwise and the average (centrally emphasized) photometry, permitting the spotwise photometry to be selectively used when taking a picture in the rear light. When using a camera having such switchable photometry arrangement, an unskilled photographer such as beginner may fail to take a picture successfully as a result of the underexposure caused by the utilization of the average photometry without noting that the object being photographed is in the rear light.

In a single lens reflex camera incorporating a focal plane shutter and capable of photometry of reflection from a film surface in which light from an object being photographed which passes through a taking lens and is reflected by the surface of the first blind of the shutter and a film surface is immediately determined to calculate an exposure period, which camera is commonly referred to as TTL (through-the-lens) direct photometry camera, an exposure control takes place by the photometry of light from an object being photographed which has passed through a diaphragm aperture which is actually controlled. Hence, the use of spotwise photometry with such camera in order to provide an exposure control is not desirable. Specifically, if the brightness of an object being photographed is low, the passage of such light through the diaphragm further reduces the level of light which is incident on a photometric circuit, causing a time delay in the leading end of an output from a photoelectric transducer element which is used for purpose of photometry, thus preventing an exact exposure period from being attained. Accordingly, the centrally biased photometry which permits a favorable photometry of almost any object being photographed is most frequently adopted with cameras which are designed for photometry of reflection from a film surface. Therefore, it would be desirable if it is possible to provide an exposure control based on the centrally biased photometry for those objects being photographed which are in the rear light, thus automatically providing a compensation for the rear light.

SUMMARY OF THE INVENTION

In view of the foregoing, it is an object of the invention to provide an exposure controller for a camera which allows a correction of exposure by automatically displacing the time when an exposure level is determined in the event there is a difference in the brightness between the main subject to be taken and its background which exceeds a given value, due to the rear light or the like.

In accordance with the invention, if a difference in the brightness between a specified area on an image field and its marginal area exceeds a given value, an integrated output voltage from a photometric circuit or a decision voltage which is used in such circuit is switched to displace the time when an exposure level is determined so that a given amount of overexposure results. Accordingly, a correction of exposure occurs automatically when taking a picture in the rear light, without the need for an intentional operation on the part of a photographer to correct for the rear light. In this manner, a picture can be taken of the object being photographed with a proper exposure, avoiding the failure such as underexposure if the camera is operated by an unskilled photographer.

DESCRIPTION OF PREFERRED EMBODIMENTS

Figure 1:
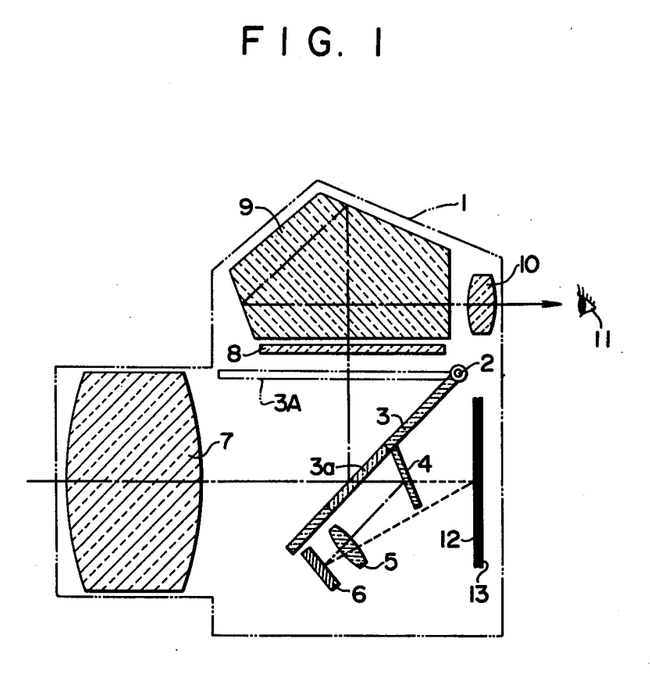
FIG. 1 is a schematic cross section of a single lens reflex camera capable of photometry of reflection from a film surface and incorporating an exposure controller according to the invention.

Referring to FIG. 1, there is shown a camera 1 including a mirror box (not shown) having an observation movable mirror 3 rotatably disposed on a support pin 2. On its rear side, the mirror 3 carries a photometry mirror 4 for cooperation with a collector lens 5 and a photometric or light receiving member 6, both of which are disposed below the mirror 3 and out of a taking light path. The light receiving surface of the photometric member 6 is disposed such that it is located opposite to both the reflecting surface of the mirror 4 and the front surface of the first blind 12 of a shutter, when the movable mirror 3 assumes its down or 45° position as shown. The movable mirror 3 includes a half mirror zone 3a, and light from an object being photographed which passes through a taking lens 7 and a diaphragm (not shown) partly transmits through the half mirror zone 3a for reflection by the mirror 4, whereupon it is directed through the collector lens 5 onto the light receiving surface of the photometric member 6. In this manner, light from an object being photographed is determined by the photometric member 6 before a shutter release takes place. Light from an object being photographed which is reflected by the movable mirror 3 is directed through a focussing glass 8, pentaprism 9, and eyepiece 10 to be incident on the eye 11 of a viewer. When a shutter release operation takes place to cause the movable mirror 3 to be resiliently driven to its position 3A shown in phantom line, the observation light path is closed while the taking light path is opened by the movable mirror 3. When the taking light path is opened, light from an object being photographed is focussed on the front surface of the first blind 12 of the shutter, which begins running, and the light is also focussed on the photosensitive surface of a film 13 which becomes exposed as the first blind runs. The light focussed on the surface of the first blind 12 and the film surface 13 is reflected by the respective surfaces to be incident on the light receiving surface of the photometric member 6 through the collector lens 5, whereby the photometric member 6 continues its photometric operation of light from an object being photographed after the shutter release.

Figure 2:
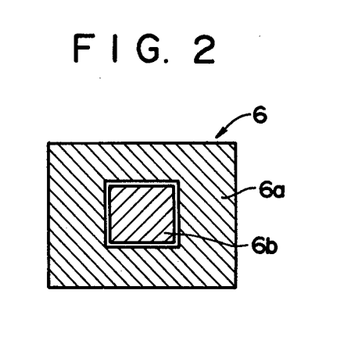
FIG. 2 is a plan view illustrating patterns on the light receiving surface of the photometric member used in the camera of FIG. 1.

As shown in FIG. 2, the photometric member 6 comprises a pair of photoelectric transducer elements 6a, 6b having different areas to receive incident light. First transducer element 6a is provided to effect an average photometry with emphasis on the central region, and is formed so as to surround a second transducer element 6b which is centrally formed to exhibit a reduced area of square configuration and which provides the spotwise photometry. It is to be noted that the ratio of the area of the light receiving surfaces of the transducer elements 6a, 6b is an integer, for example 4:1. Hence, when the movable mirror 3 assumes its down position before the shutter release takes place, as shown in FIG. 1, the incidence of completely diffuse light, such as light from an object being photographed and passing through the taking lens 7, causes the transducer elements 6a and 6b to produce photocurrents $Ip_1$ and $Ip_2$, which are related such that $4Ip_2 = Ip_1$. Specifically, when completely diffuse light is incident on the entire light receiving surface of the photometric member 6 with no difference in the brightness level, the photocurrent $Ip_1$ produced by the transducer element 6a which effects the average photometry with emphasis on the central region is chosen to be equal to four times the magnitude of the photocurrent $Ip_2$ produced by the transducer element 6b which effects the spotwise photometry. Accordingly, when the brightness of the central region of the image field, which is measured by the transducer element 6b, is by 1 EV lower in brightness than the marginal region of the image field, which is determined by the transducer element 6a, the photocurrents $Ip_1$, $Ip_2$ are related such that $8Ip_2 = Ip_1$.

In embodiments of the invention to be described below, an arrangement is made to switch an exposure level when the difference in the brightness between the light receiving surface of the first transducer element 6a and the light receiving surface of the second transducer element 6b is equal to or greater than 1 EV, in terms of exposure factor, during open photometry. It is the first transducer element 6a of the photometric member 6 which determines the exposure of the film surface after the shutter release by receiving reflected light from the surface of the first blind and film surface.

Figure 3:
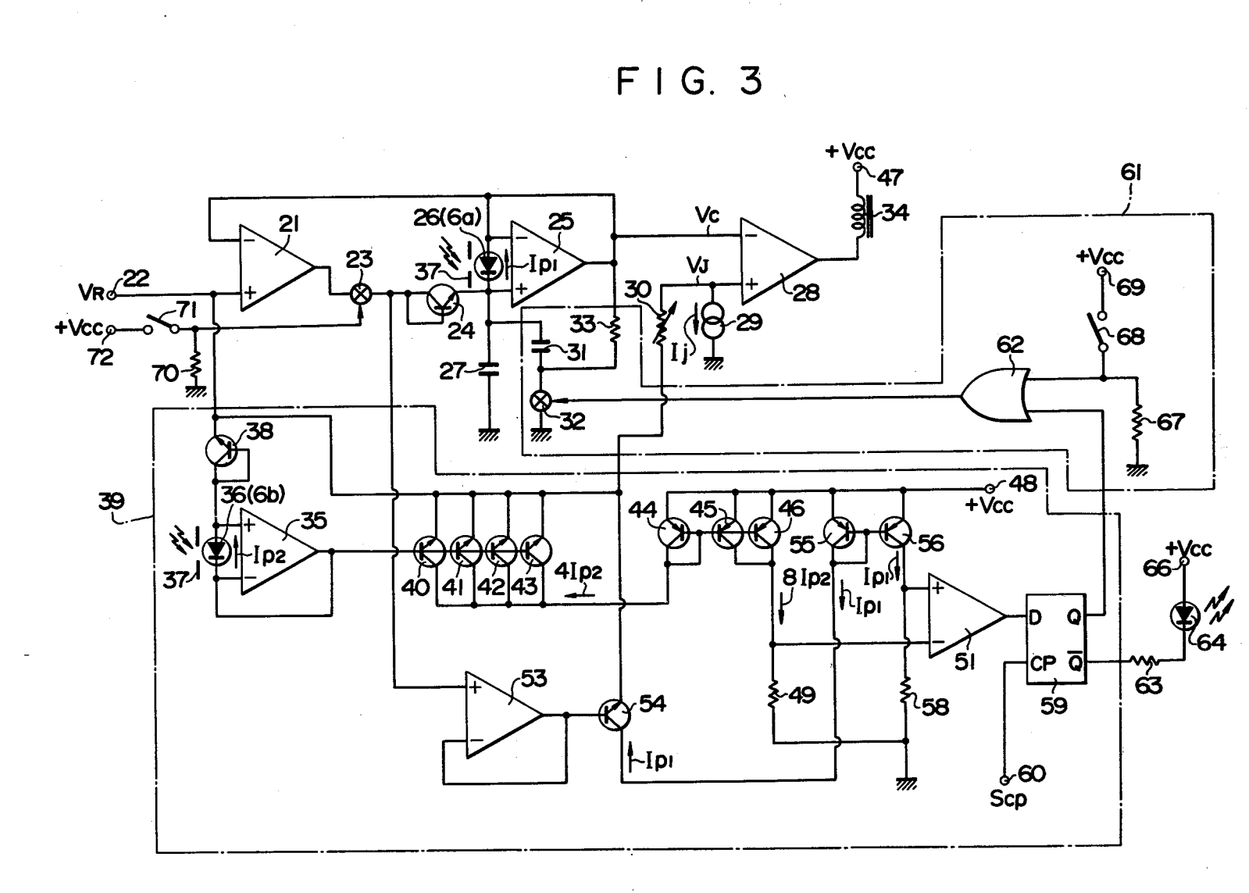
FIG. 3 is a circuit diagram of an exposure controller according to one embodiment of the invention.

FIG. 3 is a circuit diagram of an exposure controller according to one embodiment of the invention. An operational amplifier 21 has its non-inverting input terminal connected to a terminal 22, to which a reference voltage VR is applied. The output terminal of the amplifier 21 is connected through an analog switch 23 to the base and the collector of an NPN transistor 24 which provides a logarithmic compression. The analog switch 23 has a control terminal which is connected to the ground through a resistor 70 and which is also selectively connected to a terminal 72, to which a supply voltage Vcc is applied, through a trigger switch 71 which is interlocked with the first blind 12 of a shutter. The emitter of the transistor 24 is connected to the non-inverting input terminal of an integrating, operational amplifier 25, which has a photoelectric transducer element 26 connected across its inverting and non-inverting input terminal. The anode of the element 26 is connected to the inverting input terminal, and the transducer element 26 effects an average photometry with emphasis on the central region and corresponds to the first transducer element 6a shown in FIG. 2. An integrating capacitor 27 is connected between the non-inverting input terminal of the amplifier 25 and the ground. A second integrating capacitor 31 has its one end connected to the non-inverting input terminal of the amplifier 25 and has its other end connected to the ground through an analog switch 32. The junction between the capacitor 31 and the analog switch 32 is connected to the output terminal of the amplifier 25 through a resistor 33 having a high resistance value. Together with OR gate 62, a manual switch 68 which effects a correction of exposure and a resistor 67, all of which will be described later, the second integrating capacitor 31, the analog switch 32 and the resistor 33 in combination form an exposure correction circuit 61. The output terminal of the amplifier 25 is connected to the inverting input terminal thereof as well as to the inverting input terminal of the amplifier 21, and also connected to the inverting input terminal of a following comparator, operational amplifier 28. The non-inverting input terminal of the amplifier 28 is connected to the ground through a constant current source 29, and is also connected through a variable resistor 30, which is utilized to preset film speed, to the terminal 22. The output terminal of the amplifier 28 is connected to a terminal 47, to which the supply voltage Vcc is applied, through an electromagnet 34 which constrains the second blind (not shown) of the shutter from running.

A photoelectric transducer element 36 effecting a spotwise photometry of the central region of the image field is connected across the inverting and the non-inverting input terminal of an operational amplifier 35 in a brightness difference decision circuit 39, with the anode of the element connected to the non-inverting input terminal. The transducer element 36 corresponds to the second transducer element 6b shown in FIG. 2. It is to be understood that light from an object being photographed which passes through an actual diaphragm 37 is incident on the respective transducer elements 36, 26. The inverting input terminal of the amplifier 35 is connected to an output terminal thereof while the non-inverting input terminal is connected to the base and the collector of an NPN transistor 38 which provides a logarithmic compression. The emitter of the transistor 38 is connected to the terminal 22. The output terminal of the amplifier 35 is connected to the bases of four NPN transistors 40 to 43, which exhibit an identical characteristic with the transistor 38. The emitters of the transistors 40 to 43 are connected in common to the terminal 22. The collectors of the transistors 40 to 43 are connected in common and connected to the base and collector of an NPN transistor 44, which has its base connected to the bases of PNP transistors 45, 46 which exhibit an identical characteristic with the transistor 44. The emitters of the transistors 44 to 46 are connected in common and connected to a terminal 48, to which the supply voltage +Vcc is applied. The collectors of the transistors 45, 46 are connected in common and connected to the ground through a resistor 49. The junction between the transistors 45, 46 and the resistor 49 is connected to the inverting input terminal of an operational amplifier 51, which functions as a comparator.

The junction between the analog switch 23 and the transistor 24 is connected to the non-inverting input terminal of an operational amplifier 53 in the decision circuit 39, and the inverting input terminal of the amplifier 53 is connected to an output terminal thereof. The output terminal of the amplifier 53 is connected to the base of an NPN transistor 54 which exhibits an identical characteristic with the transistor 24. The emitter of the transistor 54 is connected to the terminal 22 while its collector is connected to the base and collector of PNP transistor 55, the base of which is in turn connected to the base of another PNP transistor 56 which exhibits an identical characteristic with the transistor 55. The emitters of the transistors 55, 56 are connected to the terminal 48, and the collector of the transistor 56 is connected to the ground through a resistor 58. The junction between the transistor 56 and resistor 58 is connected to the non-inverting input terminal of the amplifier 51.

The output terminal of the amplifier 51 is connected to the D input terminal of D-type flipflop 59. The flipflop 59 includes a clock input terminal CP, which is connected to a terminal 60, to which a clock pulse Scp is applied upon shutter release. The output terminal Q of the flipflop is connected to one input of OR gate 62 in the exposure correction circuit 61. The inverted output terminal $\overline{Q}$ of the flipflop 59 is connected through a resistor 63 to the cathode of a light emitting diode 64, the anode of which is connected to a terminal 66, to which the supply voltage +Vcc is applied. The other input of OR gate 62 is connected to the ground through the resistor 67 and also selectively connected to a terminal 69, to which the supply voltage +Vcc is applied, through the manual switch 68 which provides a correction of exposure. The output terminal of OR gate 62 is connected to the control terminal of the analog switch 32.

In operation, when the taking lens 7 of the camera is directed toward an object being photographed, light from an object being photographed and passing through the taking lens 7 and open diaphragm 37 and reflected by the mirror 4, as shown in FIGS. 1 and 2, is incident on the transducer elements 26 (6a), 36 (6b), whereby these transducer elements produce photocurrents $Ip_1$, $Ip_2$ in accordance with the amount of light which the respective light receiving regions have received.

When the shutter blind has been wound up to charge the shutter, the trigger switch 71 is closed as is the analog switch 23. Accordingly, the reference voltage VR is applied from the output terminal of the amplifier 21 to the non-inverting input terminal of the amplifier 25 through the analog switch 23 and the transistor 24.

No clock pulse Scp is applied to the clock input terminal CP of the D-type flipflop 59, and hence its output terminal Q assumes a low level (hereafter referred to as "L" level), so that both inputs to the gate 62 are at a low level when the switch 68 is open as shown, causing the gate 62 to produce an output of "L" level, which is effective to open the analog switch 32. The second integrating capacitor 31 has its other end connected to the output terminal and the inverting input terminal of the amplifier 25 through the resistor 33, and hence the potential difference across the capacitor is equal to zero. Thus, the closure of the analog switch 23 allows only the capacitor 27 to be charged to a level which corresponds to the reference voltage VR.

However, when the transducer element 26 produces the photocurrent $Ip_1$, the current $Ip_1$ flows through the transistor 24 in a direction from its collector to its emitter. Since the emitter potential of the transistor 24 is equal to the potential at the inverting input terminal of the amplifier 25, which is in turn equal to the reference voltage VR through the action of the amplifier 21, it will be seen that the emitter potential of the transistor 24 is equal to the emitter potential of the transistor 54. Because of the amplifier 53, the base potential of the transistor 24 is equal to the base potential of the transistor 54. Thus, the base-to-emitter voltage of the transistor 54 is equal to the base-to-emitter voltage of the transistor 24, whereby a collector current equal to the photocurrent $Ip_1$ flows through the transistor 54. The flow of the collector current $Ip_1$ through the transistor 54 causes the current $Ip_1$ to flow from the emitter to the collector of the transistor 55, and the current mirror effect causes the current $Ip_1$ also to flow through the collector of the transistor 56. Hence, representing the resistance of resistor 58 by $R_1$, there is developed a voltage $Ip_1 \cdot R_1$, which is applied to the non-inverting input terminal of the amplifier 51.

When the photocurrent $Ip_2$ is produced by the transducer element 36, the current $Ip_2$ flows through the transistor 38 in a direction from its collector to its emitter. The base potential of the transistor 38 is equal to the potential at the output terminal of the amplifier 35 while the emitter potential of the transistor 38 is equal to the common emitter potential of the transistors 40 to 43. Accordingly, the base-to-emitter voltage of the transistors 40 to 43 is equal to the base-to-emitter voltage of the transistor 38, and thus a collector current equal to the photocurrent $Ip_2$ flows through each of the transistors 40 to 43. When the current $Ip_2$ flows through each of the four transistors 40 to 43, it follows that a current which is four times the current $Ip_2$ flows through the transistor 44 from its emitter to its collector. The flow of the current $4Ip_2$ through the transistor 44 causes the current $4Ip_2$ to flow through each collector of the transistors 45, 46 by the current mirror effect, whereby a current equal to $8Ip_2$ flows through the resistor 49. Since the resistor 49 has a resistance which is equal to the resistance $R_1$ of the resistor 58, there is developed a voltage $8Ip_2 \cdot R_1$ thereacross, which is applied to the inverting input terminal of the amplifier 51. It is to be understood that the resistors 49, 58 may be replaced by forwardly-poled diodes having an identical characteristic.

Where a small difference in the brightness prevails between the central region of the image field where the transducer element 36 intended for spotwise photometry is disposed, and the marginal region where the transducer element 26, intended for the average photometry with emphasis on the central region, is disposed, or stated differently, where the brightness of the main subject to be taken which is located on the central region of the image field is lower than but within 1 EV of the brightness of the background, the photocurrents $Ip_1$ and $Ip_2$ are related such that $Ip_1 < 8Ip_2$. Hence, the output of the amplifier 51 is an "L" level. However, when the brightness of the main subject to be taken, disposed on the central region of the image field where the transducer element 36 is disposed, is lower than the brightness of the background region of the image field where the transducer element 26 is disposed, by an amount equal to or greater than 1 EV, the photocurrents $Ip_1$ and $Ip_2$ are related such that $Ip_1 \geq 8Ip_2$. The output of the amplifier 51 then reverts to an "H" level. The output level of the amplifier 51 thus depends on the magnitude of the difference in the brightness between the central region and the marginal region of the image field. The operation which occurs subsequent to shutter release will now be described with reference to the timing charts shown in FIGS. 4 and 5, which illustrate the operations when the aforesaid brightness difference is low and high.

(1) When the difference in the brightness is small and photocurrents are related such that $Ip_1 < 8Ip_2$, the amplifier 51 in the brightness difference decision circuit produces an output of "L" level. Accordingly, upon shutter release which allows the application of the clock pulse Scp to the clock input terminal CP of the D-type flipflop 59, the Q output remains at its "L" level, which feeds "L" to one input of the gate 62. Hence the output from OR gate 62 of the exposure correction circuit 61 remains at its "L" level as before the shutter release, maintaining the analog switch 32 open. The inverted output terminal $\overline{Q}$ of the flipflop 59 assumes its "H" level, precluding a current flow through the diode 64, which therefore does not emit light.

Figure 4:
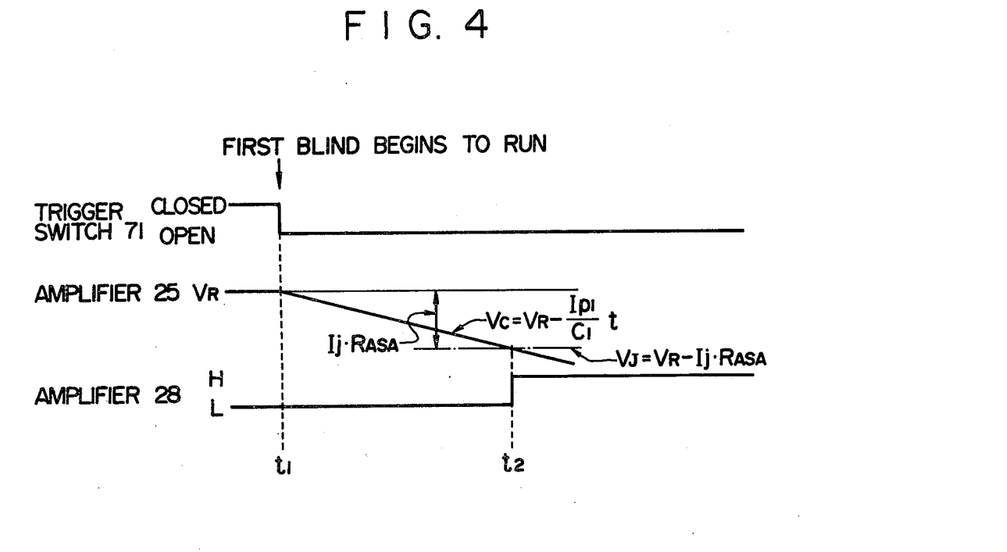
FIGS. 4 and 5 graphically illustrate the operation of the exposure controller shown in FIG. 3.

Subsequently when a given diaphragm aperture is set and the movable mirror 3 is driven upward to open the taking light path and the first blind of the shutter begins running, the trigger switch 71 is opened at time $t_1$, as shown in FIG. 4. Thus, the analog switch 23 is opened. When the analog switch 23 is opened, the charging path for the integrating capacitor 27 is interrupted, and the charge thereon discharges through the photocurrent $Ip_1$. Representing the capacitance of the capacitor 27 by $C_1$, the integrated voltage, or the output voltage Vc from the amplifier 25, changes with a slope defined by the equation $Vc = VR - (Ip_1/C_1)t$, from $t_1$ on; as indicated in FIG. 4. The output voltage Vc of the amplifier 25 is compared against a decision voltage VJ in the amplifier 28. Representing the resistance of the variable resistor 30, which is used to preset film speed, by $R_{ASA}$ and the constant current flow through the source 29 by $Ij$, the decision voltage VJ is given by the equation $VJ = VR - Ij \cdot R_{ASA}$. So long as the voltage Vc is higher than the decision voltage VJ, the amplifier 28 produces an output of "L" level, so that the electromagnet 34 remains energized, constraining the second blind from running.

As the output voltage Vc from the amplifier 25 decreases gradually and a time passes when the film surface has been subjected to a proper amount of the exposure, the output voltage Vc reaches the decision voltage VJ. At time $t_2$ when $Vc \leq VJ$, or $(Ip_1/C_1)t \geq Ij \cdot R_{ASA}$, the output of the amplifier 28 changes to its "H" level, thus deenergizing the electromagnet 34 and releasing the second blind of the shutter for running, thus terminating an exposure.

(2) When the difference in the brightness between the central and the marginal region of the image field is high and the photocurrents are related such that $Ip_1 \geq 8Ip_2$, the amplifier 51 of the brightness difference decision circuit 39 produces an output of "H" level, so that the Q output of the flipflop 59 changes to its "H" level at the same time as the shutter release takes place, producing a brightness difference signal. OR gate 62 of the exposure correction circuit 61 then produces an output of "H" level, thus closing the analog switch 32. The closure of the analog switch 32 connects the other end of the second integrating capacitor 31 to the ground, whereby the capacitor 31 is connected in parallel with the first integrating capacitor 27. Accordingly, the second capacitor 31 is also charged to the reference voltage VR immediately, in the same manner as the first capacitor 27. The inverted output terminal $\overline{Q}$ of the flipflop 59 then assumes its "L" level, whereby there occurs a current flow through the light emitting diode 64, which therefore emits light to indicate that a correction of exposure is made as a result of a great difference in the brightness level.

Figure 5:
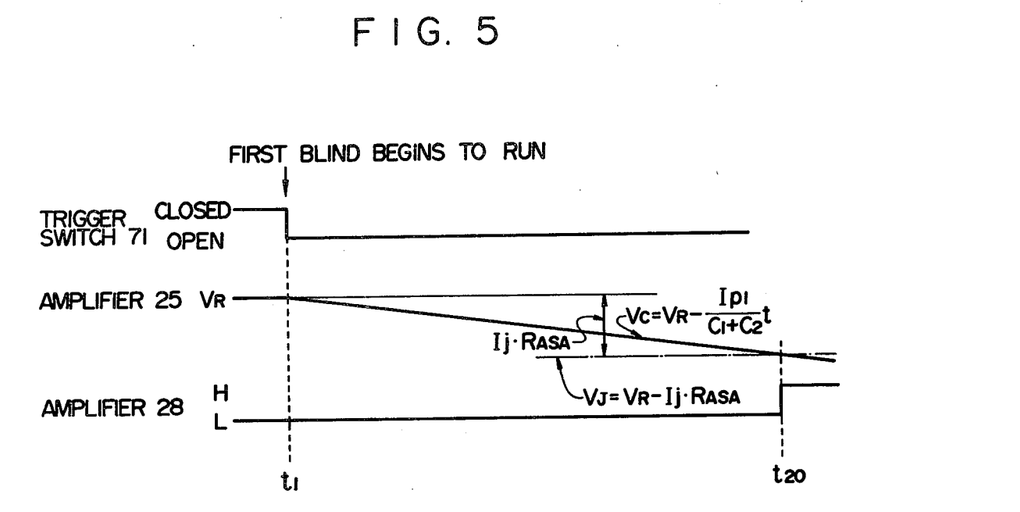

Subsequently, the diaphragm aperture is preset, and the movable mirror 3 is driven upward. As the first blind 12 of the shutter begins running at time $t_1$, the trigger switch 71 is opened as is the analog switch 23, as shown in FIG. 5. The opening of the analog switch 23 interrupts the charging path for the first and the second capacitor 27, 31, which therefore discharge in accordance with the photocurrent $Ip_1$. Representing the capacitance of the second capacitor 31 by $C_2$, the parallel connection of the capacitors 27, 31 results in a composite capacitance of $C_1 + C_2$. Accordingly, the output voltage Vc of the amplifier 25 changes with a slope defined by $Vc = VR - (Ip_1)/(C_1 + C_2)t$, as indicated in FIG. 5, from time $t_1$ on. It will be seen that as compared with the operation mentioned in the paragraph (1), the output voltage Vc during the rear light operation decreases with a reduced slope as compared with the slope shown in FIG. 4. As the output voltage Vc decreases and reaches the decision voltage VJ or $Vc \leq VJ$ at time $t_{20}$, the output of the amplifier 28 changes to its "H" level, whereupon the electromagnet 34 is deenergized, allowing the second blind of the shutter to run to terminate an exposure. It will also be seen that the reduced slope with which the output voltage Vc decreases causes the time $t_{20}$ when the exposure level is determined to be displaced or delayed with respect to the corresponding time when the integration takes place with the first capacitor 27 alone as mentioned above in the paragraph (1). Thus, the correction of exposure is effected in a direction toward overexposure. The resulting correction permits an exposure control in which a proper exposure is assured for the main subject to be taken which is centrally located on the image field.

In the photographing operation mentioned in the paragraph (1), the subject can be photographed at an increased brightness level over an increased time interval by closing the manual switch 68. The closure of the manual switch 68 causes OR gate 62 to produce an output of "H" level, thereby closing the analog switch 32. The subsequent shutter release permits an integrating operation by both the first and the second capacitor 27, 31 as mentioned above in the paragraph (2), allowing a correction of exposure.

In the exposure controller of the embodiment described above, the capacitance of the integrating capacitor is automatically switched when utilizing a photographing operation in the rear light. However, it will be seen that instead of changing the capacitance, the decision voltage which is used for comparison with the integrated voltage may be automatically switched. Such arrangement will now be described.

Figure 6:
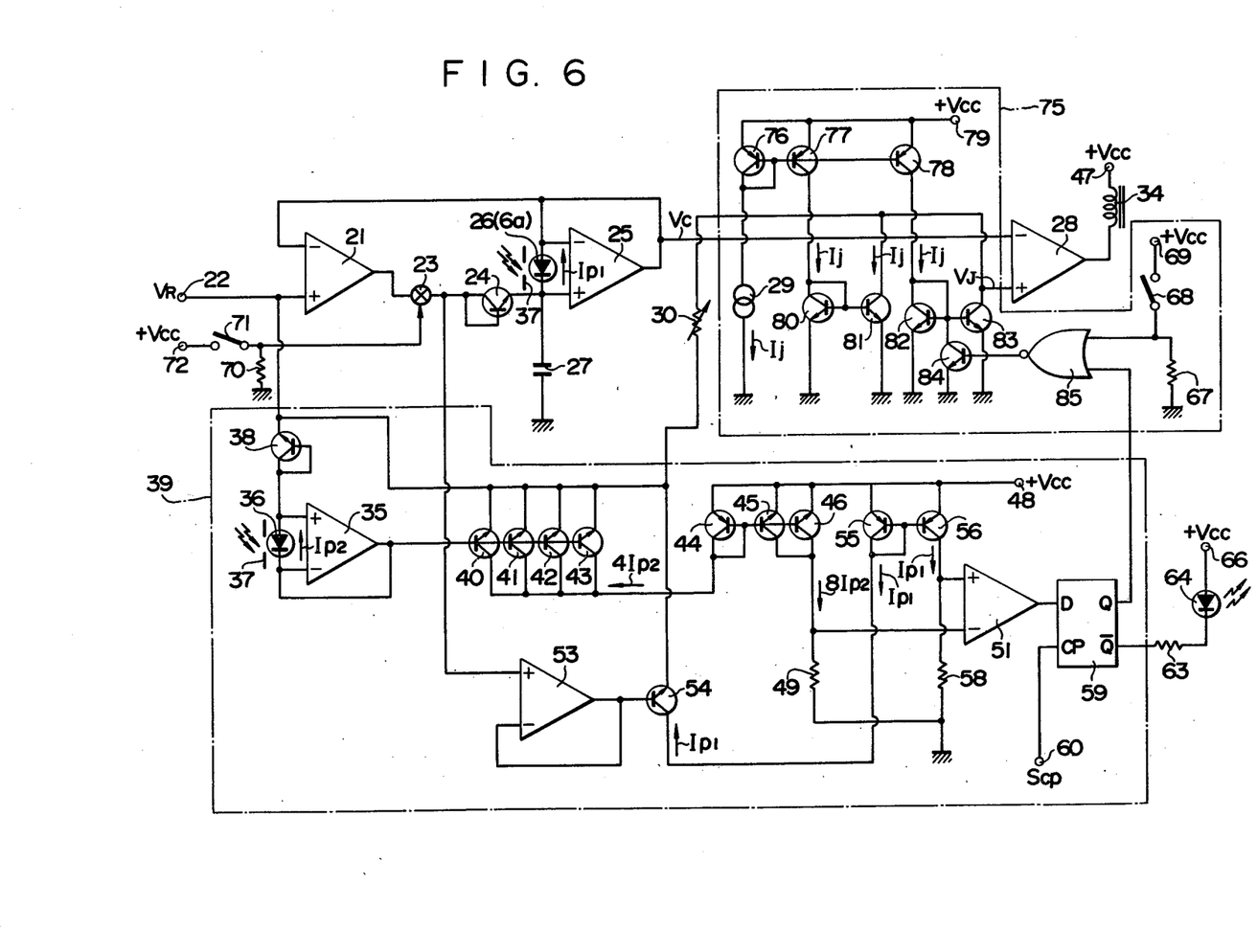
FIG. 6 is a circuit diagram of an exposure controller according to another embodiment of the invention.

FIG. 6 is a circuit diagram of an exposure controller according to another embodiment of the invention. In FIG. 6, corresponding parts to those shown in the electrical circuit of FIG. 3 are designated by like reference numerals and characters without repeating their description. In the exposure controller of FIG. 6, only the integrating capacitor 27 is connected across the non-inverting input terminal of the operational amplifier 25 and the ground. The output terminal of the amplifier 25 is connected to the inverting input terminal of the operational amplifier 28, the non-inverting input terminal of which is connected with the variable resistor 30, which is used to preset film speed. An exposure correction circuit 75 includes a constant current source 29, which is not directly connected to the amplifier 28 as before, but is connected between the collector of PNP transistor 76 and the ground. The collector of the transistor 76 is connected to the base thereof, which is in turn connected to the bases of PNP transistors 77, 78, which exhibit the identical characteristic with the transistor 76. The emitters of the transistors 76 to 78 are connected in common to a terminal 79, to which the supply voltage +Vcc is applied. The collector of the transistor 77 is connected to the collector and the base of NPN transistor 80, the emitter of which is connected to the ground and the base of which is connected to the base of NPN transistor 81, which exhibits an identical characteristic with the transistor 80. The collector of the transistor 81 is connected to the non-inverting input terminal of the amplifier 28 while its emitter is connected to the ground. The collector of the transistor 78 is connected to the collector and the base of NPN transistor 82, which has its emitter connected to the ground and which has its base connected to the base of NPN transistor 83, which exhibits an identical characteristic with the transistor 82. The collector of the transistor 83 is connected to the non-inverting input terminal of the amplifier 28, and its emitter is connected to the ground. The bases of the transistors 82, 83 are connected to the collector of NPN transistor 84, which has its emitter connected to the ground. The base of the transistor 84 is connected to the output terminal of NOR gate 85, one input terminal of which is connected to the output terminal Q of the flipflop 59 in the brightness difference decision circuit 39 and the other input of which is connected to the junction between the resistor 67 and the manual switch 68 which effects a correction of exposure.

In the operation of the described exposure controller circuit 75, the output level of the amplifier 51 in the brightness difference decision circuit 39 is automatically switched in accordance with the difference in the brightness between the central and the marginal region of the image field, as mentioned above in connection with the first embodiment. The operation which occurs subsequent to the shutter release will be described below with reference to the timing charts shown in FIGS. 7 and 8.

(1) When a difference in the brightness between the central and the marginal region of the image field is small and the photocurrents are related such that $Ip_1 < 8Ip_2$, the output of the amplifier 51 in the brightness difference decision circuit 39 assumes its "L" level, and hence the output terminal Q of the flipflop 59 remains at its "L" level as before the shutter release, even though shutter release takes place. When the Q output of the flipflop 59 is at its "L" level, the output of NOR gate 85 in the exposure correction circuit 75 remains at its "H" level so long as the manual switch 68 remains open. This renders the transistor 84 conductive to cause the transistors 82, 83 to assume the base potential of "L" level, which prevents the transistors 82, 83 from conducting. The source 29 supplies a constant current Ij through the transistor 76, and the current mirror effect causes a collector current equal to the current Ij to flow through each of the transistors 77, 78. The flow of the current Ij through the transistor 77 also passes through the transistor 80, and the same current also flows through the transistor 81 by the current mirror effect. The current Ij which flows through the transistor 78 passes through the transistor 84 rather than through the transistor 82. Considering the two transistors 81, 83 connected to the non-inverting input terminal of the amplifier 28, it will be seen that the transistor 82 is non-conductive because of the "H" level output from NOR gate 85 while the transistor 81 alone conducts the constant current Ij. Accordingly, the decision voltage VJ applied to the non-inverting input terminal of the amplifier 28 is $VJ = VR - Ij \cdot R_{ASA}$. The $\overline{Q}$ output of the flipflop 59 assumes its "H" level, which prevents a current flow through the light emitting diode, which therefore does not emit light as mentioned previously.

Figure 7:
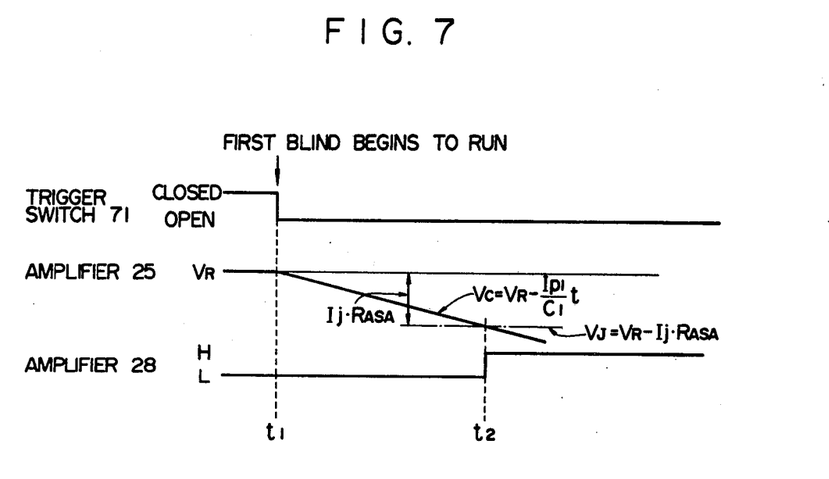
FIGS. 7 and 8 graphically illustrate the operation of the exposure controller shown in FIG. 6.

Subsequently, the diaphragm aperture is preset and the movable mirror is driven upward. As the first blind of the shutter begins running and the trigger switch 71 is opened at time $t_1$, the analog switch 23 is opened, and the capacitor 27 begins to discharge in accordance with the photocurrent $Ip_1$. Accordingly, the output voltage Vc of the amplifier 25 decreases with the slope defined by the equation $Vc = VR - (Ip_1/C_1)t$ as shown in FIG. 7, generally in the similar manner as illustrated in FIG. 4 for the first embodiment. At time $t_2$, $Vc \leq VJ$ or $(Ip_1/C_1)t \geq Ij \cdot R_{ASA}$, whereby the output of the amplifier 28 changes to its "H" level, deenergizing the electromagnet 34 to permit the second blind of the shutter to run, thus terminating an exposure.

(2) When a difference in the brightness between the central and marginal region of the image field is high and the photocurrents are related such that $Ip_1 \geq 8Ip_2$, the output from the amplifier 51 in the brightness difference decision circuit 39 assumes its "H" level, in contrast to the operation mentioned in the paragraph (1). Accordingly, the Q output of the flipflop 59 assumes its "H" level to deliver a brightness difference signal at the same time as the shutter release takes place. This causes NOR gate 85 to produce an output of "L" level, whereby the transistor 84 is rendered non-conductive. This increases the base potential of the transistors 82, 83, which therefore conduct. The collector current Ij of the transistor 78 then flows through the transistor 82, and also flows through the collector of the transistor 83 by the current mirror effect. Thus, both transistors 81 and 83, which are connected to the non-inverting input terminal of the amplifier 28, conduct the current Ij. Accordingly, the magnitude of the current flow through the variable resistor 30 is equal to 2Ij, and thus the decision voltage VJ is $VJ = VR - 2Ij \cdot R_{ASA}$. At this time, the $\overline{Q}$ output of the flipflop 59 assumes its "L"

level to allow the diode 64 to emit light, thus indicating that the correction of exposure is taking place.

Figure 8:
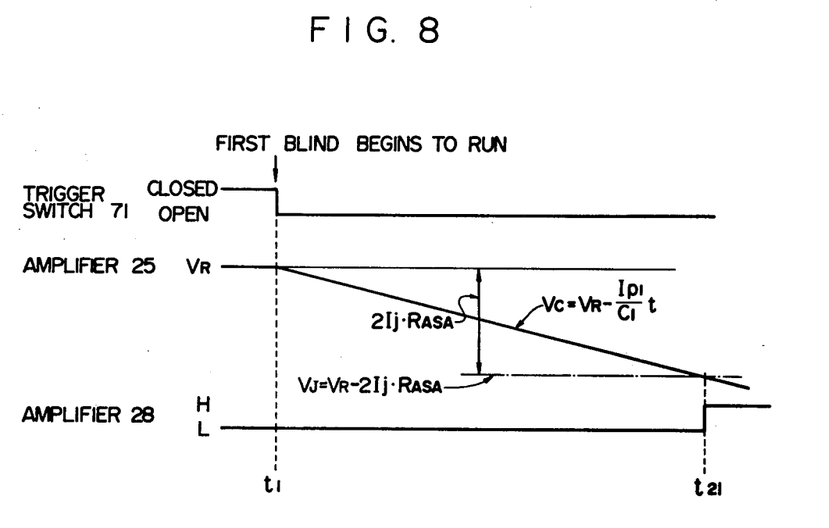

Subsequently, the diaphragm aperture is preset and the movable mirror 3 is driven upward. At the first blind of the shutter begins running and the trigger switch 71 is opened and the analog switch 23 is opened at time $t_1$, as shown in FIG. 8, the capacitor 27 begins to discharge in accordance with the photocurrent $I_{p1}$. Thus, as before, the output voltage Vc of the amplifier 25 decreases, from time $t_1$ on, with a slope defined by the equation $Vc = VR - (I_{p1}/C_1)t$. When the output voltage Vc decreases and reaches the decision voltage VJ or $Vc \leq VJ$ or $(I_{p1}/C_1)t \geq 2Ij \cdot R_{ASA}$ (since $VJ = VR - 2Ij \cdot R_{ASA}$) at time $t_{21}$, the output of the amplifier 28 changes to its "H" level, deenergizing the electromagnet 34 to allow the second blind of the shutter to run, thus terminating an exposure. It will be noted that because the time $t_{21}$ when the exposure level is determined occurs at a time when the reduction in the output voltage Vc is twice as great as the reduction occurring in the operation mentioned in the paragraph (1), the described exposure control achieves a correction of exposure such that an overexposure results which is by 1 EV greater than the normal exposure. Therefore, the main subject to be taken such as a person centrally located on the image field can be given a proper amount of exposure as a result of such correction.

In this embodiment, the manual switch 68 may be closed under the situation that a difference in the brightness is small, to effect the correction of exposure as mentioned above in order to achieve an increased brightness level over the image field, as in the previous embodiment.

In the embodiments shown in FIGS. 3 and 6, the correction of exposure is effected when the central region is by 1 EV or greater lower than the marginal region of the image field. However, the particular value of the difference in the brightness for which the correction of exposure is effected is not critical, but any desired value may be chosen. In addition, a variable difference can be established by suitable design. In certain instances, the central region of the image field may be of higher brightness than the marginal region for some objects being photographed. In such instance, a suitable arrangement may be made to assure a proper exposure of the marginal region.

What is claimed is:

1. An exposure controller for a camera, comprising:
   a photometric assembly disposed within a camera which is adapted to effect TTL direct photometry, the photometric assembly including a first photoelectric transducer element designed for average photometry with emphasis on the central region of an image field and a second photoelectric transducer element designed for spotwise photometry, both transducer elements having light receiving areas disposed for photometry of light from an object being photographed which passes through a taking lens;
   a photocurrent integrator for integrating an output current from at least one of the transducer elements;
   a brightness difference decision circuit responsive to photometric outputs from the transducer elements to compare the brightness of a specific area on the image field against the brightness of its marginal area and to produce a brightness difference signal whenever the difference of the aforesaid brightness values assume a given relative value;
   and an exposure correction circuit responsive to the brightness difference signal for altering the time when an exposure period is determined based on the comparison of an output voltage from the photocurrent integrator and a decision voltage preset in the camera, by a given amount in a direction toward overexposure.

2. An exposure controller according to claim 1 in which the photometric assembly is disposed out of a taking light path of the camera and includes a light receiving surface which is configured in a manner to correspond to the image field and disposed to allow projection thereon of light reflection from a photometric movable mirror, the surface of a shutter blind and a film surface, said first and the second photoelectric transducer elements having light receiving surfaces having a ratio of areas which is an integer.

3. An exposure controller according to claim 1 in which the brightness difference decision circuit comprises said second transducer element designed for spotwise photometry, a current mirror circuit for multiplying the output photocurrent from the second transducer element by a given factor in accordance with a preset difference in the brightness between the specific area and its marginal area on the image field, and a circuit for producing outputs of different levels as a result of a comparison of the multiplied value of the output current from the second transducer element against the output photocurrent from the first transducer element.

4. An exposure controller according to claim 1 in which the preset difference in the brightness is preferably equal to 1 EV in terms of an exposure factor.

5. An exposure controller according to claim 1 in which the exposure correction circuit comprises a logic gate for producing the brightness difference signal in response to a shutter release of the camera whenever a difference in the brightness between the specific area and the marginal area of the image field exceeds a given value, said integrator comprising capacitor means, and an analog switch for automatically altering the capacitance of said integrator capacitor means in response to the brightness difference signal from the said logic gate, the output voltage from the integrator decreasing at a reduced rate as the capacitance is switched to enable a correction of exposure toward overexposure as the output voltage reaches the decision voltage.

6. An exposure controller according to claim 5 in which the value of the decision voltage depends on the film speed of the film being used.

7. An exposure controller according to claim 1 in which the exposure correction circuit comprises an NOR gate for producing the brightness difference signal in response to a shutter release of the camera whenever a difference in the brightness between the specific area and the marginal area of the image field exceeds a given value, and a circuit for automatically reducing the magnitude of the decision voltage against which the output voltage from the integrator is compared, in response to the brightness difference signal from said gate, the reduced value of the decision voltage allowing a correction of exposure toward overexposure as the output voltage from the integrator reaches the level of the decision voltage.

8. An exposure controller according to claim 7 in which the value of the decision voltage depends on the film speed of the film being used.

9. An exposure controller according to claim 1 further comprising settable switch means for manually providing a time displacement signal; and said exposure correction circuit comprising means responsive to said time displacement signal for altering the time when an exposure period is determined independently of said brightness difference signal.

10. An exposure controller according to claim 5 further comprising settable switch means for manually providing a time displacement signal; and said logic gate being responsive to said time displacement signal for operating said analog switch independently of said brightness difference signal.

11. An exposure controller according to claim 7 further comprising settable switch means for manually providing a time displacement signal; and said NOR gate being responsive to said time displacement signal for operating said adjusting circuit independently of said brightness difference circuit.

12. A brightness difference decision circuit for use in an exposure controller circuit employed in a camera having a TTL direct photometry system comprising:

a photometric assembly having a first photoelectric transducer element for providing average photometry with emphasis on the central region of an image field, and a second photoelectric transducer element for providing spotwise photometry, said first and second transducer elements having light receiving areas of different sizes disposed to receive light from an object being photographed and which passes through a taking lens;

said areas $A_1$ and $A_2$ differing from one another by a factor K where $A_1 = KA_2$ and $K > 1$, amplifying means for amplifying the photocurrent produced by said second transducer element by a factor N to compensate for the difference in photocurrent magnitudes produced by the first and second transducer elements due to the difference in the light receiving areas of said first and second elements, and also to compensate for a difference in the photocurrent magnitudes produced by the first and second transducer elements due to a predetermined difference in the brightness of the light sensed by said first and second transducer elements;

means for developing voltages from each of said photocurrents; and means for comparing said voltages for producing a brightness difference signal when the developed voltages differ by a predetermined value.

13. The decision circuit as claimed in claim 12, wherein said amplifying means comprises means for amplifying the photocurrent produced by the second transducer element by said factor K to equalize the photocurrents produced by said first and second transducer elements when substantially perfect uniform diffusion light impinges upon both of said transducer elements, and means for amplifying the output from said means for amplifying by the factor K by the factor N/K.

14. A brightness difference decision circuit for use in an exposure controller circuit employed in a camera having a TTL direct photometry system comprising:

a photometric assembly having a first photoelectric transducer element for providing average photometry with emphasis on the central region of a image field, and a second photoelectric transducer element for providing spotwise photometry, said first and second transducer elements having light receiving areas of different sizes diposed to receive light from an object being photographed and which passes through a taking lens;

said areas $A_1$ and $A_2$ differing from one another by a factor K where $A_1 = KA_2$ and $K < 1$;

means for altering the photocurrent produced by one of said first and second transducer elements so that the photocurrent produced by the transducer element having the smaller size light receiving area generates a photocurrent which is more than K times greater than the photocurrent produced by the transducer element having the larger size light receiving area to compensate for the difference in photocurrent due to the difference in size of the light receiving areas and also to compensate for a difference in the photocurrents produced by the first and second transducer elements due to a predetermined difference in the brightness of the light sensed by said first and second transducer elements;

means for developing voltages from the photocurrents produced by said first and second transducer elements; and means for comparing said voltages for producing a brightness difference signal when the developed voltages differ by a predetermined value.

* * * * *

UNITED STATES PATENT AND TRADEMARK OFFICE
CERTIFICATE OF CORRECTION

PATENT NO. : 4,456,354
DATED : June 26, 1984
INVENTOR(S) : Kazunori Mizokami

It is certified that error appears in the above-identified patent and that said Letters Patent is hereby corrected as shown below:

Column 10:

Line 24, change "82" to --83--.

Signed and Sealed this

Thirtieth Day of April 1985

[SEAL]

*Attest:*

DONALD J. QUIGG

*Attesting Officer*  *Acting Commissioner of Patents and Trademarks*